United States Patent Office 3,474,405
Patented Oct. 21, 1969

3,474,405
METHOD AND APPARATUS FOR DETECTING THE PRESENCE OF ENEMY PERSONNEL IN SUBTERRANEAN CHAMBERS
Louis R. Padberg, Jr., Santa Barbara, Calif., assignor to the United States of America as represented by the Secretary of the Navy
Filed May 17, 1968, Ser. No. 730,679
Int. Cl. G01s 3/80
U.S. Cl. 340—16                           8 Claims

ABSTRACT OF THE DISCLOSURE

A method of ascertaining the presence of inhabited caves in densely-forested territory held, or formerly held, by an enemy prior to invasion of such territory by military personnel. The method comprises the dropping by parachute from an aircraft of an assembly consisting of a radio transmitter and a geophone connected to the transmitter by a long cable. After the descent of the parachute is arrested by dense foliage, the geophone is fired into the ground, where it detects sonic vibrations emanating from inhabited caves and supplies this data over the cable to the radio transmitter.

---

The invention described herein may be manufactured and used by or the Government of the United States of America for governmental purposes without the payment of any royalties thereon or therefor.

BACKGROUND OF THE INVENTION

In tropical or semi-tropical regions, ground-based military operations are often of a type popularly designated as "guerrila warfare," in which small groups of defenders employ "hit-and-run" tactics to demoralize and wear down a numerically-superior foe. Such maneuvers commonly take place in areas where the defenders have an intimate knowledge of the terrain over which the action occurs, and are able to entrench themselves in relatively inaccessible locations or under cover of dense foliage where they cannot readily be discovered by aerial reconnaissance.

When penetrating such areas, an invader is under a considerable handicap, since he faces the element of surprise, and the almost-certain presence of "booby-traps" does not make his task any less difficult. Consequently, it is accepted military strategy to "flush out" such hidden defenders when an expedition into enemy-held territory is conducted. Unfortunately, enemy personnel are usually adept at concealment, and are often able to avoid discovery while the penetrating forces advance beyond their position. They then emerge from their hiding places and have the advantage of conducting forays from behind the invader's front lines.

One expedient employed by a defender to conceal his presence from the foe is to excavate a cave, or subterranean chamber, which may be stocked with provisions and where he can remain for a considerable period of time. Since the entrance to such a cave is usually cleverly camouflaged, an invader often remains unaware of its existence.

It would be highly desirable to provide some method whereby the presence of enemy personnel in natural caves or underground excavations can be detected prior to the time that foot soldiers enter an area then occupied by the enemy, or which was formerly so occupied. Once the presence of individuals in caves is determined, the task of driving them from their shelter becomes more or less routine.

It is known to employ geophones, or seismic vibrations, to obtain information regarding sub-surface conditions in order to efficiently conduct oil and mineral exploratory operations. These instruments are especially sensitive to low-frequency vibrations passing through the earth, and hence can readily detect echoes reflected from rock layers and other geological discontinuities such that a fairly accurate picture of underground conditions can be obtained. However, such instruments are customarily embedded into the earth by hand, and the data picked up thereby generally observed and/or recorded in the immediate vicinity of the device per se.

SUMMARY OF THE INVENTION

In the process of digging caves, or even during the normal habitation thereof, low-frequency sounds are generated, which sounds can travel for a considerable distance through the earth. If these sounds can be detected without exposing military personnel to the dangers associated with actual entry by foot into an enemy territory, a considerably higher degree of success with expeditionary missions will result.

In accordance with a feature of the present concept, an instrumentation package is dropped from a helicopter or other aircraft flying low over a territory suspected of harboring enemy soldiers in caves. This package contains a parachute which opens to allow the assembly to fall fairly slowly into the tree-tops, or otherwise become entangled in the dense foliage which is assumed to form a ground cover at a height which may reach a hundred feet or more in tropical regions. Following this termination of parachute descent, means are provided for expelling downwardly a pointed rod on which the geophone is carried, the rod embedding itself into the ground to form an excellent pick-up for the geophone attached thereto. Vibrations detected by such device are conducted by wire to a radio transmitter which has remained with the parachute, and this transmitter broadcasts the data so derived to a receiving station located in the aircraft or elsewhere. No actual exposure of personnel to the enemy is consequently necessary.

One object of the present invention, therefore is to provide an improved method and means for detecting the presence of individuals in caves or other underground excavations without actually setting foot in the region where the caves are suspected of being located.

Another object of the invention is to provide means whereby a geophone or other seismic detecting device, together with a radio transmitter, may be dropped by parachute from an aircraft in an area of dense foliage, the radio transmitter remains in the foliage with the parachute while the geophone is propelled downwardly into the earth.

Another object of the invention is to provide, in an assembly of the class described, a time-delay mechanism energized as a function of parachute opening, such mechanism acting after a predetermined period of time to release gas from a pressurized source in order to supply propulsive energy sufficient to drive the geophone downwardly and into the ground.

Other objects, advantages, and novel features of the invention will become apparent from the following detailed description of the invention when considered in conjunction with the accompanying drawings.

DESCRIPTION OF THE PREFERRED EMBODIMENT

Figure 1:
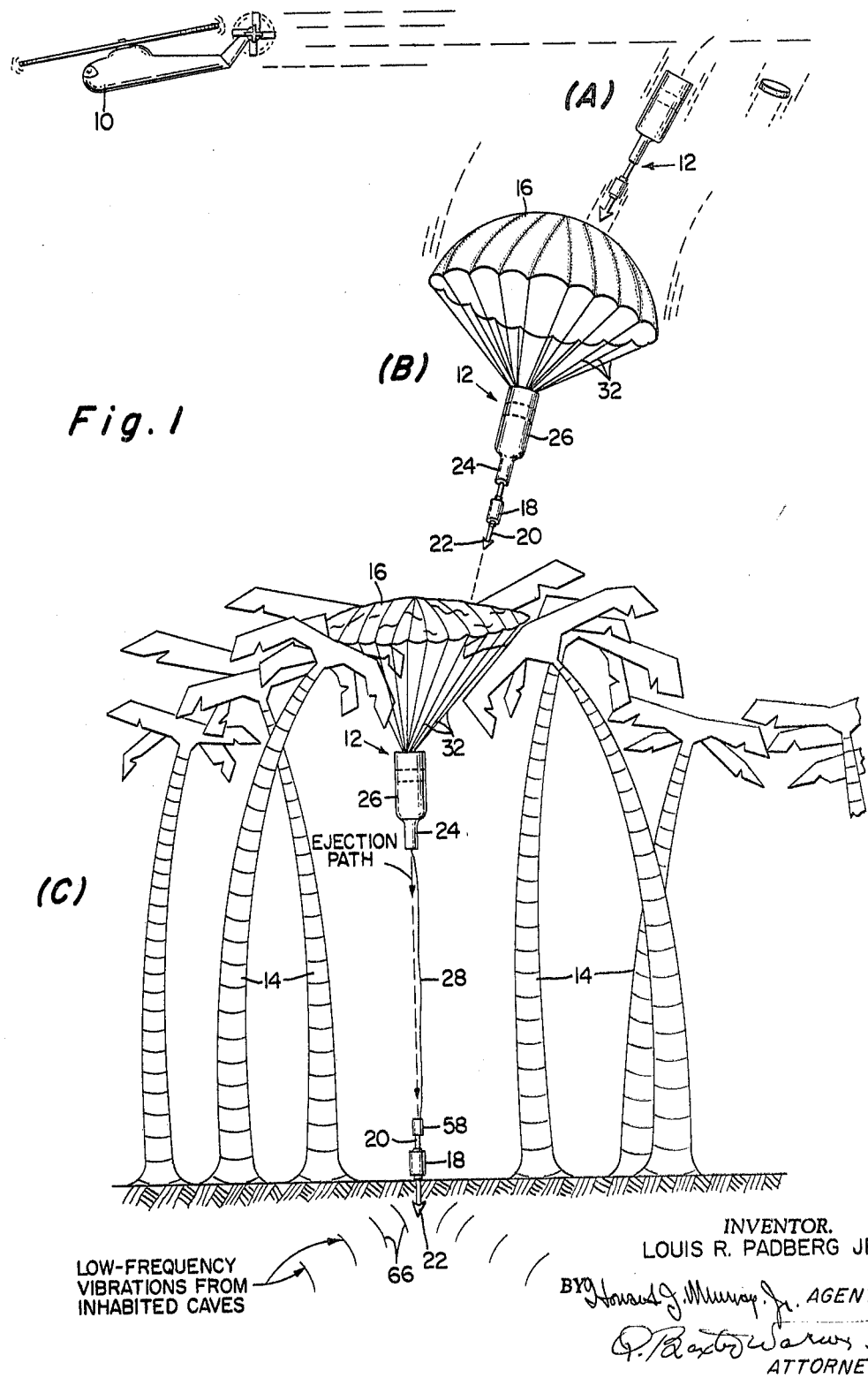
FIG. 1 is step-by-step presentation showing (1) the instrumentation package of the present invention being dropped from an aircraft, (2) the parachute opening to slow descent of the package, and (3) the geophone assembly embedded in the ground after the shaft on which the geophone is carried has been expelled under pressure from its cylindrical housing following entanglement of the parachute in tropical foliage.

The present invention contemplates the provision of a parachute-supported instrumentation package made up of a radio transmitter and a geophone, together with means for propelling the geophone into the earth approximately a predetermined period of time after the parachute has opened following its release from an aircraft. These features of the concept will be better understood by reference to FIG. 1 of the drawings, wherein is shown an aircraft such as a helicopter, identified by the reference numeral 10. The instrumentation package, generally represented by the reference numeral 12, is dropped from aircraft 10 while the latter is flying low over a territory suspected of harboring enemy personnel in caves and into which region it is deemed hazardous to send foot soldiers. It is assumed that the climatic conditions of the region are such that dense foliage is present, represented in the drawing by the trees 14.

When rapid descent of the instrumentation package 12 is slowed by opening of parachute 16, a time-delay mechanism is energized, this mechanism being subsequently described in connection with a discussion of FIG. 2 of the drawings. At the present point, however, it need only be mentioned that the package 12 slowly descends until the parachute 16 becomes entangled in the trees 14.

A geophone 18 forms part of the instrumentation package 12. This geophone, which may be in the form of a ring of barium titanate or lead zirconate, encircles a hollow shaft 20 the tip 22 of which is sarpened or pointed to facilitate penetration of the earth's surface. The inner extremity of shaft 20 is enclosed within a tubular projection 24 extending from, but of smaller diameter than, the tubular housing 26 of the instrumentation package 12.

It has been stated that a time-delay mechanism is energized upon opening of parachute 16. The time-delay of this mechanism is so chosen that, following entanglement of the parachute 16 in the foliage 14 as shown in FIG. 1, propulsive energy contained within the package 12 is released at the expiration of the delay period. The effect of the release of this propulsive energy is to drive the shaft 20 carrying the geophone 18 out of the tubular projection 24 and downwardly to the earth's surface, the pointed tip 22 entering the ground as shown in the drawing. A wire or cable 28 is connected to geophone 18, and leads therefrom to a radio transmitter 30 located within the instrumentation package 12. As shown in FIG. 1, this wire 28 follows the shaft 20 when the latter is propelled from the tubular projection 24 following expiration of the pre-set time-delay period.

Figure 2:
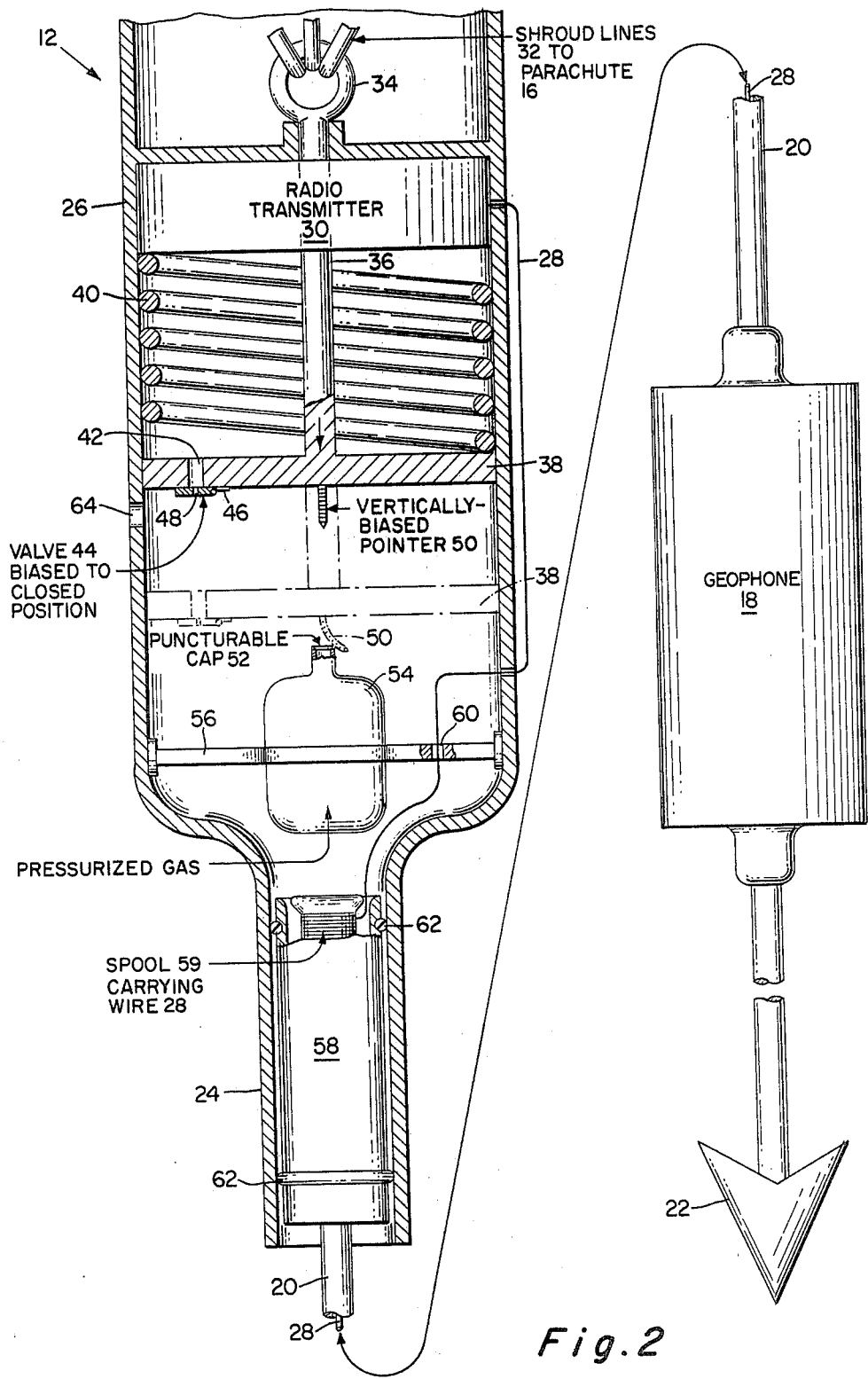
FIG. 2 is a detailed view, partly in section, of the instrumentation package of FIG. 1.

Reference is now made to FIG. 2 of the drawings for a more detailed explanation of the operation of the present concept. As will be noted, the parachute shroud lines 32 are connected to a ring 34 located on one end of a rod 36 extending axially of the tubular housing 26 and terminating in a piston member 38 slidably contained within the housing. The rod 36 passes through a central aperture in the radio transmitter 30, the latter possessing a self-contained antenna (not shown). Between the transmitter 30 and piston 38 is disposed a coil spring 40 adapted to be compressed upon an upward (in the drawing) movement of piston 38. An opening 42 in the piston 38 is associated with a valve 44 which is normally biased to closed position by a spring hinge 46. The valve 44 is formed with a small aperture 48 therein to permit slow passage of fluid therethrough even when the valve is in its closed position as illustrated in the drawing.

Extending downwardly from the lower surface of piston 38 is a sharp pointer 50 which normally extends coaxially with the rod 36 (as shown in solid lines) but is resiliently deformable so as to lie in a position such as shown in broken lines prior to compression of spring 40. It is held in this bent position by pressure thereagainst of the puncturable cap 52 of a container 54 containing gas under pressure. The container 54 is maintained in such a position by a bracing member 56 that the puncturable cap 52 is aligned with the sharp pointer 50 when the latter extends essentially vertically (as shown in solid lines) when piston 38 moves upwardly to compress spring 40.

The tubular housing 26 is, as above stated, formed with a tubular downwardly extending portion 24 of smaller diameter than housing 26. The shaft 20 terminates in a tubular jacket 58 within which is located a spool 59 upon which a major portion of the wire 28 is wound when the assembly is as shown in FIG. 2. One end of wire 28 passes through an opening 60 in bracket 56 and thence to radio transmitter 30 along the outer surface of housing 26 as shown in the drawing. The other end of wire 28 extends through the central opening in rod 20 to make electrical connection with the geophone 18 as brought out in FIG. 2. A pair of O-rings 62 form a gas-tight seal between members 24 and 58, as shown.

OPERATION

The parachute 16 opens in conventional fashion when the instrumentation package 12 is dropped from aircraft 10. When this occurs, a strong and fairly abrupt force is exerted on the ring 34 to which the parachute shroud lines 32 are attached. This force draws shaft 36 upwardly from its initial position as shown in broken lines in FIG. 2 compress spring 40. Air contained within the spring compartment is rapidly expelled through port 42, the valve 44 opening against the action of spring element 46 due to this air pressure until the piston reaches its position of maximum travel as shown in solid lines. The pointer 50, being free of contact with the cap 52 of container 54, now assumes a straight position as shown in solid lines.

Following the initial shock of parachute opening, the spring 40 would normally tend to return piston 38 to its original position depicted by the broken lines. However, it is precluded from doing so in rapid fashion due to the fact that valve 44 is now closed by spring hinge 46 creating a partial vacuum in the chamber within which spring 40 is located. Nevertheless, the aperture 48 of restricted size allows a small amount of air to pass into the chamber containing spring 40, and, as this restricted amount of air enters, the piston 38 slowly travels downwardly (in the drawing).

When the downward movement of piston 38 has reached a point where the piston clears an opening 64 formed in the housing 26, a relatively large amount of external air is free to enter the chamber containing spring 40, and the movement of piston 38 is no longer restrained by a partial vacuum existing in the chamber. The piston thus moves quickly downwardly, causing the sharp pointer 50 to puncture the cap 52.

By proper choice of dimensions for the aperture 48 and for the location of opening 64, the period of time required for piston 38 to return to its original position can be quite precisely determined.

When the sharp pointer 50 is carried by piston 38 to make contact with the cap 52, it punctures this cap and allows the pressurized gas within containers 54 to escape. The resulting pressurization of the lower portion of housing 26 exerts a force on the end of jacket 58 which encircles shaft 20, and this shaft, carrying geophone 18, is forcefully expelled from the tubular extension 24 much in the manner of an underwater spear gun utilized by aqua-lung divers. As the shaft so travels downwardly, wire 28 is unwound from spool 59, the wire extending upwardly as shown in FIG. 1 of the drawings after the tip 22 of rod 20 has buried itself in the ground.

The time-delay of the assembly including spring hinge 40 and valve 44 is so chosen as to permit the parachute 16 to become ensnared or entangled in the foliage 14 before the cap 52 is punctured by pointer 50. This prevents any premature ejection of rod 20 while the instrumentation package is at too high an altitude to ensure that good contact is made between geophone 18 and the ground through rod 20.

As schematically illustrated in FIG. 1, low-frequency vibrations 66 traveling through the earth from inhabited caves are picked up by the geophone 18 through rod 20, and electrical signals conveyed over wire 28 to the radio transmitter 30. They are then broadcast to a receiving point where they may be reproduced directly or recorded on any suitable storage medium.

Obviously other types of the time-delay devices may be employed in place of the valve assembly 44, such, for example, as a clock mechanism which releases a spring following a pre-set period of time. It is also contemplated that the geophone 18 be protected from shock such as by potting it in polyurethane or a suitable epoxy resin. The gas within cylinder 54 may be of any nature, but carbon dioxide is preferred.

If it is desired to pin-pont the location of any inhabited caves which are detected by the means of the present invention, a number of instrumentation packages may be dropped separately at spaced-apart points and then the directional information derived by conventional triangulation techniques.

Obviously many modifications and variations of the present invention are possible in the light of the above teachings. It is therefore to be understood that the invention may be practiced otherwise than as specifically described.

I claim:
1. A method of ascertaining the presence of enemy-inhabited caves in regions covered by dense foliage prior to entry into such regions of military personnel, said method comprising:
 dropping from an aircraft flying over such regions a parachute-supported instrumentation package consisting of a self-contained radio transmitter and a geophone connected to said transmitter;
 propelling said geophone to the surface of the ground when the descent of said parachute and the remainder of the instrumentation package support thereby is arrested by entanglement with said foliage;
 deriving from said geophone electrical signals upon the detection by said geophone of earth vibrations indicative of human habitation in caves;
 conveying the electrical signals derived from said geophone to said radio transmitter; and
 broadcasting from said transmitter electromagnetic energy representative of said signals.

2. The method of claim 1 in which said geophone is provided with an elongated projecting member which enters the ground when the geophone is propelled to the surface, thereby facilitating detection by said geophone of the said earth vibrations.

3. The method of claim 2 in which the elongate member projecting from said geophone is in the form of a spike.

4. A parachute-supported instrumentation package designed to be dropped from an aircraft in a densely-foliated region in order to ascertain the presence of enemy personnel in underground locations and to radiate electromagnetic signals indicative of such presence, said instrumentation package comprising:
 a radio transmitter;
 an earth-vibration-detecting unit including an elongate member designed to penetrate the surface of the earth and enter into intimate contact with the latter;
 means operating after the descent of said package is interrupted by entanglement of said parachute with said foliage to propel said detecting unit downwardly so that said elongated member penetrates the surface of the earth thereby to facilitate the detection by said unit of earth vibrations originating in said underground locations; and
 means electrically connecting said unit to said radio transmitter.

5. An instrumentation package according to claim 4, in which said means for propelling said unit downwardly so that said elongate member penetrates the surface of the earth includes a source of pressurized gas.

6. The combination of claim 5, further including a time-delay mechanism connected to said source of pressurized gas and operating to release gas from said source to propel said unit downwardly.

7. The combination of claim 6 in which said time-delay mechanism is activated upon the opening of said parachute following the dropping of said instrument package from said aircraft.

8. The combination of claim 6 in which said gas is carbon dioxide.

References Cited
UNITED STATES PATENTS

| | | | |
|---|---|---|---|
| 2,683,867 | 7/1954 | Vann | 340—17 |
| 3,360,772 | 12/1967 | Massa | 340—17 |

RICHARD A. FARLEY, Primary Examiner

U.S. Cl. X.R.

340—17, 258, 261